US009781047B2

(12) United States Patent
Muramoto et al.

(10) Patent No.: US 9,781,047 B2
(45) Date of Patent: Oct. 3, 2017

(54) WIRELESS COMMUNICATION TERMINAL AND WIRELESS COMMUNICATION METHOD

(71) Applicant: Panasonic Intellectual Property Corporation of America, Torrance, CA (US)

(72) Inventors: Eiichi Muramoto, Kanagawa (JP); Takahiro Yoneda, Osaka (JP); Ryota Ohnishi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 197 days.

(21) Appl. No.: 14/844,030

(22) Filed: Sep. 3, 2015

(65) Prior Publication Data

US 2016/0081074 A1 Mar. 17, 2016

(30) Foreign Application Priority Data

Sep. 16, 2014 (JP) .................................. 2014-187620

(51) Int. Cl.
*H04L 12/801* (2013.01)
*H04W 40/00* (2009.01)
(Continued)

(52) U.S. Cl.
CPC ............ *H04L 47/29* (2013.01); *H04L 45/306* (2013.01); *H04W 40/00* (2013.01);
(Continued)

(58) Field of Classification Search
None
See application file for complete search history.

(56) References Cited

U.S. PATENT DOCUMENTS

2015/0039681 A1* 2/2015 Gupta ................ H04L 67/2857
709/203
2015/0109926 A1* 4/2015 Jin ........................ H04W 40/04
370/235

FOREIGN PATENT DOCUMENTS

| JP | 2002-176676 | 6/2002 |
| JP | 2008-182378 | 8/2008 |
| JP | 2011-061681 | 3/2011 |

OTHER PUBLICATIONS

Van Jacobson et al., "Networking Named Content" ACM CoNEXT, 2009.

* cited by examiner

*Primary Examiner* — Christine Duong
(74) *Attorney, Agent, or Firm* — Greenblum & Bernstein, P.L.C.

(57) ABSTRACT

A wireless communication terminal includes a processor; and a non-transitory memory storing thereon a program which is executed by the processor, the program causing the processor to: transmit a first interest packet requesting transmission of an index of content to a plurality of communication devices via a content-oriented network; receive a first data packet from a first communication device among the plurality of communication devices in response to the first interest packet, wherein the first data packet includes i) the index and ii) first remaining battery level information indicating a remaining battery level of the first communication device, and determine to transmit to the first communication device a second interest packet requesting for transmission of the content to the wireless communication terminal when it is determined that the first remaining battery level information is more than a predetermined threshold value.

8 Claims, 8 Drawing Sheets

(51) Int. Cl.
*H04W 52/02* (2009.01)
*H04L 12/725* (2013.01)
*H04W 28/06* (2009.01)
*H04W 4/00* (2009.01)

(52) U.S. Cl.
CPC ........ *H04W 52/0277* (2013.01); *H04W 4/008* (2013.01); *H04W 28/06* (2013.01); *Y02B 60/50* (2013.01)

FIG. 8

| WIRELESS COMMUNICATION SECTION 511 | DESTINATION TYPE 512 | COMMUNICATION DEVICE 513 | ELECTRIC POWER CONSUMPTION 514 | REMAINING BATTERY LEVEL 515 |
|---|---|---|---|---|
| FIRST | INFRASTRUCTURE | BASE STATION ID-A | 20 | — |
| SECOND | TERMINAL-TERMINAL | TERMINAL-a | 3 | 80 |
| SECOND | TERMINAL-TERMINAL | TERMINAL-b | 3 | 20 |
| SECOND | TERMINAL-TERMINAL | TERMINAL-c | 6 | 80 |
| SECOND | TERMINAL-TERMINAL | TERMINAL-d | 2 | 10 |

510

WIRELESS COMMUNICATION TERMINAL AND WIRELESS COMMUNICATION METHOD

BACKGROUND

1. Technical Field

The present disclosure relates to a wireless communication terminal having a plurality of wireless communication sections each wirelessly communicating with another communication device and a wireless communication method in the wireless communication terminal.

2. Description of the Related Art

Conventionally, a wireless communication terminal that is capable of performing both infrastructure-based communication with a wireless base station or the like and communication with a mobile information terminal or the like located close to the wireless communication terminal has been in widespread use (see, for example, Japanese Unexamined Patent Application Publication No. 2002-176676, Japanese Unexamined Patent Application Publication No. 2008-182378, and Japanese Unexamined Patent Application Publication No. 2011-061681).

A communication standard that enables long-range and middle-range communication such as LTE (Long Term Evolution), base-station-based Wi-Fi (Wireless Fidelity) (registered trademark), or WiMAX (Worldwide Interoperability for Microwave Access) (registered trademark) is generally employed for communication with a wireless base station or the like (hereinafter referred to as "infrastructure communication"). Meanwhile, a communication standard that enables short-range communication such as Wi-Fi DIRECT (registered trademark) or Bluetooth (registered trademark) is employed for communication with a mobile information terminal or the like (hereinafter referred to as "proximity communication").

In recent years, a content-oriented network has been attracting attention (see, for example, Van Jacobson, Diana K. Smetters, James D. Thornton, Michael F. Plassi, Nicholas H. Briggs, and Rebecca L. Braynard. Networking Named Content. ACM CoNEXT, 2009). The content-oriented network is a communication network in which content management and routing (transfer) are performed on the basis of a content name.

In the content-oriented network, content is transferred by transmission and reception of an interest packet designating a name which is an identifier of the content. The content-oriented network is a CCN (Content Centric Network) or an NDN (Named Data Network).

However, the aforementioned conventional arts still need further improvements.

SUMMARY

In one general aspect, the techniques disclosed here feature a wireless communication terminal includes a processor; and a non-transitory memory storing thereon a program which is executed by the processor, the program causing the processor to: transmit a first interest packet requesting transmission of an index of content to a plurality of communication devices via a content-oriented network; receive a first data packet from a first communication device among the plurality of communication devices in response to the first interest packet, wherein the first data packet includes i) the index and ii) first remaining battery level information indicating a remaining battery level of the first communication device, and determine to transmit to the first communication device a second interest packet requesting for transmission of the content to the wireless communication terminal when it is determined that the first remaining battery level information is more than a predetermined threshold value.

According to the present disclosure, it is possible to reduce the possibility of running out of battery because of collaborative content acquisition.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 8 is a diagram illustrating an example of an electric power information table in the present embodiment.

DETAILED DESCRIPTION

Figure 1:
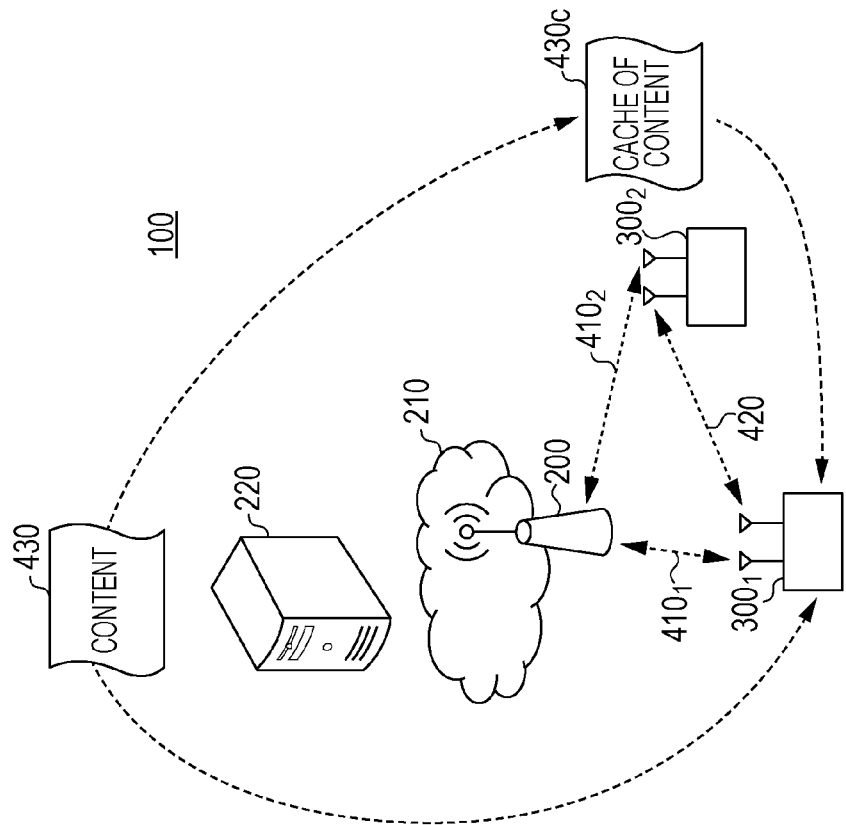
FIG. 1 is a system configuration diagram illustrating an example of a configuration of a communication system in the present embodiment.

Underlying Knowledge Forming Basis of the Present Disclosure

A more flexible content sharing environment can be realized by applying a content-oriented network to wireless communication terminals.

For example, assume that a wireless communication terminal is about to acquire content distributed by a data publishing terminal on the Internet and that another wireless communication terminal (hereinafter referred to as a "nearby terminal") that exists close to the wireless communication terminal has already acquired the content. In this case, the wireless communication terminal can selects, as a content acquisition source, not only the data publishing terminal but also the nearby terminal. Furthermore, the wireless communication terminal can request the nearby terminal to acquire the content from the data publishing terminal by using infrastructure communication.

Infrastructure communication generally consumes more electric power than proximity communication. Furthermore, competition and overlap of communications occur in a case where a plurality of wireless communication terminals concurrently perform infrastructure communication or acquire the same content. When a representative one of the plurality of wireless communication terminals that constitute a proximity communication network acquires the content from the data publishing terminal, each of the wireless communication terminals can acquire the desired content while suppressing electric power consumption of the whole network.

However, when a wireless communication terminal with a low remaining battery level performs infrastructure communication, the wireless communication terminal is highly likely to run out of battery. One option to cope with this problem is to employ a technique for determining a communication method on the basis of information concerning a remaining battery level of a wireless communication terminal that is about to acquire content. With the technique, in a case where a remaining battery level of a wireless communication terminal is low, the wireless communication terminal acquires content by selecting not infrastructure communication but proximity communication. This makes it possible to reduce the possibility that the wireless communication terminal runs out of battery.

However, although it is possible to reduce the possibility that a wireless communication terminal that is about to acquire content runs out of battery, there is a risk of a higher possibility that a nearby terminal that exists close to the wireless communication terminal runs out of battery. That is, the conventional art has a problem that, on a network level, it is difficult to reduce the possibility of running out of battery because of content acquisition which a plurality of wireless communication terminals perform in collaboration with one another (hereinafter referred to as "collaborative content acquisition").

In view of this, the inventor of the present invention considered the following improvements in order to solve the above problems.

(1) A wireless communication terminal according to one aspect of the present disclosure includes: a processor; and a non-transitory memory storing thereon a program which is executed by the processor, the program causing the processor to: transmit to a plurality of communication devices a first interest packet requesting for transmission of an index of content to the wireless communication terminal via a content-oriented network in which content management or content routing is performed on the basis of a content name corresponding to the index of the content; receive a first data packet from a first communication device among the plurality of communication devices in response to the first interest packet, wherein the first data packet includes i) the index of the content and ii) first remaining battery level information indicating a first remaining battery level of the first communication device; and determine to transmit to the first communication device a second interest packet requesting for transmission of the content to the wireless communication terminal when it is determined that the first remaining battery level is more than a predetermined threshold value.

(2) In the aspect, the first communication device may exist within a predetermined range from the wireless communication terminal.

(3) In the aspect, in a case where the remaining battery level is equal to or lower than the predetermined threshold value, it may be determined that the second interest packet is not transmitted to the first communication device.

(4) In the aspect, the first interest packet may include namespace information commonly used for the wireless communication terminal and the plurality of the communication devices in the content-oriented network.

(5) In the aspect, the program may further cause the processor to: acquire own-terminal remaining battery level information indicating a remaining battery level of the wireless communication terminal, within the wireless communication terminal; and determine the predetermined threshold value on the basis of the own-terminal remaining battery level information.

(6) In the aspect, the program may further cause the processor to transmit the second interest packet to a wireless base station via the content-oriented network, in a case where it is determined that the second interest packet is not transmitted to the first communication device.

(7) In the aspect, in a case where it is determined that the second interest packet is transmitted to the first communication device, the program may further cause the processor to: transmit the second interest packet to the first communication device; receive a second data packet including a block that constitutes the content from the first communication device in response to the second interest packet, wherein the second data packet includes second remaining battery level information indicating a second remaining battery level of the first communication device; and determine whether or not to transmit to the first communication device a third interest packet requesting for transmission of a next block that constitutes the content to the wireless communication terminal, when it is determined that the second remaining battery level is more than the predetermined threshold value.

(8) In the aspect, the program may further cause the processor to transmit the second interest packet to a second communication device that is different from the first communication device in a case where it is determined that the second interest packet is not transmitted to the first communication device.

(9) A wireless communication terminal according to another aspect of the present disclosure includes: a processor; and a non-transitory memory storing thereon a program which is executed by the processor, the program causing the processor to: acquire remaining battery level information indicating a remaining battery level of the wireless communication terminal within the wireless communication terminal; transmit the remaining battery level information to a plurality of communication devices via a content-oriented network in which content management or content routing is performed on the basis of a content name; receive a first interest packet requesting for transmission of first content from a first communication device among the plurality of the communication devices; and perform at least one of (i) transfer of the first interest packet to a second communication device that is different from the first communication device when the first communication device does not store the content and (ii) transmission of a first data packet including a block that constitutes the first content to the first communication device when the first communication device stores the content.

(10) In the aspect, the plurality of the communication devices may exist within a predetermined range from the wireless communication terminal.

(11) In the aspect, the program may further cause the processor to: receive a second interest packet requesting for transmission of an index of the first content from the first communication device; and transmit a second data packet including the index and the remaining battery level information to the first communication device.

(12) In the aspect, the program may further cause the processor to transmit to the plurality of communication device a third interest packet requesting for transmission of at least one of second content and an index of the second content to the wireless communication terminal, the third interest packet including the remaining battery level information.

(13) In the aspect, the first communication device and the second communication device may exist within a predetermined range from the wireless communication terminal.

(14) A wireless communication method for a wireless communication terminal according to one aspect of the present disclosure includes: transmitting to a plurality of communication devices a first interest packet requesting for transmission of an index of content to the wireless communication terminal, in a content-oriented network in which content management or content routing is performed on the basis of a content name corresponding to the index of the content; receiving a first data packet from a first communication device among the plurality of communication devices in response to the first interest packet, wherein the first data packet includes the index and first remaining battery level information indicating a first remaining battery level of the first communication device; and determining to transmit to the first communication device a second interest packet requesting for transmission of the content to the wireless communication terminal when it is determined that the first remaining battery level is more than a predetermined threshold value.

(15) A wireless communication method for a wireless communication terminal according to another aspect of the present disclosure includes: acquiring remaining battery level information indicating a remaining battery level of the wireless communication terminal within the wireless communication terminal; transmitting the remaining battery level information to a plurality of communication devices via a content-oriented network in which content management or content routing is performed on the basis of a content name; and receive a first interest packet requesting for transmission of first content from a first communication device among the plurality of the communication devices; and performing at least one of (i) transfer of the first interest packet to a second communication device that is different from the first communication device when the first communication device does not store the content and (ii) transmission of the content to the first communication device when the first communication device stores the content.

An embodiment of the present disclosure is described in detail below with reference to the drawings.

System Configuration

First, an example of a configuration of a communication system including a wireless communication terminal according to the present embodiment is described.

FIG. 1 is a system configuration diagram illustrating a configuration of a communication system in the present embodiment.

A communication system 100 illustrated in FIG. 1 is a communication system that is a content-oriented network. That is, in the communication system 100, content is transmitted and received on the basis of not information indicative of the place where the content is stored (e.g., IP address), but the name of the content (hereinafter referred to as "content name").

In FIG. 1, the communication system 100 includes a wireless base station 200 and a plurality of wireless communication terminals $300_1$ and $300_2$. The wireless base station 200 is remotely located from the wireless communication terminals $300_1$ and $300_2$, and the wireless communication terminal $300_1$ and the wireless communication terminal $300_2$ are located close to each other. The wireless base station 200 is remotely located, for example, because the communication system 100 can be realized at a lower cost when a large number of wireless communication terminals 300 are contained in the communication system 100. Note that the communication system 100 can include other wireless communication terminals 300 (not illustrated).

The wireless base station 200 is, for example, an access point of an Internet provider that is attached to a wall, a telephone pole, or the like. The wireless base station 200 is connected to a data publishing terminal 220 via a communication network 210 such as the Internet.

The data publishing terminal 220 is, for example, a server managed by a service that distributes content. The data publishing terminal 220 stores therein data of content and publishes content.

The term "publish" as used herein encompasses an operation of creating a state in which a data publishing terminal can transmit, in response to an interest packet transmitted to a specific namespace, a packet (hereinafter referred to as "data packet") including data of content (hereinafter simply referred to as "content") to which a name belonging to the namespace is assigned or data of an index (hereinafter simply referred to as "index") that will be described later. Furthermore, the term "publish" as used herein encompasses an operation of registering, on a specific interface of a nearby relay device (not illustrated) such as a router, transfer information indicating that an interest packet transmitted to the namespace is transferred to a data publishing terminal itself.

The specific namespace is, for example, a namespace that is commonly used in the communication system that is a content-oriented network. That is, each interest packet includes information (namespace information) belonging to the common namespace and requests data by using the namespace information.

A plurality of relay devices disposed in the communication system 100 propagate transfer information received from the data publishing terminal 220 by using a routing protocol such as an OSPFN (Open Shortest Path Fast by Named Data Network). This realizes transfer of a packet among the relay devices.

Through such publishing of content and propagation of transfer information, the interest packet is transmitted to the data publishing terminal 220 having target content. Then, the data packet is transmitted to a transmission source of the interest packet as a response to the interest packet in an opposite direction by the same route as the route by which the interest packet was transferred.

The wireless communication terminals $300_1$ and $300_2$ are, for example, mobile information terminals such as smartphones or tablet terminals. The wireless communication terminals $300_1$ and $300_2$ are located in a place, such as a sports stadium, an event site, a station, or an intersection, where people who possess a wireless communication terminal 300 exist in high density.

The wireless communication terminals $300_1$ and $300_2$ perform infrastructure communication $410_1$ and $410_2$ with the wireless base station 200, respectively. Furthermore, the wireless communication terminals $300_1$ and $300_2$ perform proximity communication 420 with each other.

For example, assume that the wireless communication terminal $300_1$ is about to acquire content 430 published by the data publishing terminal 220. In this case, a route for acquisition of the content 430 can be selected from a first route using the infrastructure communication $410_1$ and a second route using the proximity communication 420, i.e., a route passing the wireless communication terminal $300_2$, which is a nearby terminal.

Furthermore, communication devices including the wireless communication terminals $300_1$ and $300_2$ have not only a function as a packet relay device, but also a function of caching transferred content. This is a characteristic of the content-oriented network.

This allows the communication system 100 to efficiently distribute content while suppressing bandwidth consumption of each section. For example, in a case where the wireless communication terminal $300_2$ already has a cache $430_c$ of content, the wireless communication terminal $300_1$ can acquire the cache $430_c$ from the wireless communication terminal $300_2$.

Characteristics of Wireless Communication Terminal according to Present Embodiment In general, content such as video data is uploaded on an infrastructure-based network such as the Internet. Accordingly, even in a situation in which a plurality of wireless communication terminals 300 are located in high density, at least one wireless communication terminal 300 needs to acquire content by using the infrastructure communication 410 as a representative of a proximity communication network.

However, the representative wireless communication terminal 300 consumes more electric power because of its transmission operation for transmitting the acquired content to other wireless communication terminals 300. Therefore, when the wireless communication terminal $300_1$ first decides to acquire content, there is an issue of whether the wireless communication terminal $300_1$ itself becomes a representative or the wireless communication terminal $300_1$ requests the wireless communication terminal $300_2$, which is a nearby terminal, to become a representative.

Furthermore, electric power consumed in the wireless communication terminal $300_1$ in a case where the wireless communication terminal $300_1$ acquires the content 430 by using the infrastructure communication $410_1$ is larger than that consumed in the wireless communication terminal $300_1$ in a case where the wireless communication terminal $300_1$ acquires the content 430 by using the proximity communication 420. This is, for example, because a communication distance is longer. Accordingly, the wireless communication terminal $300_1$ can reduce electric power consumption by actively using the proximity communication 420 for transmission of an interest packet requesting the content 430.

However, in a case where the proximity communication 420 is used in consideration of only a reduction of electric power consumption of the wireless communication terminal $300_1$, it becomes more likely that the wireless communication terminal $300_2$ runs out of battery as described above. Accordingly, even in a case where the wireless communication terminal $300_2$, which is a nearby terminal, has already acquired content, there is an issue of whether or not the wireless communication terminal $300_1$ should acquire the content from the wireless communication terminal $300_2$.

In view of this, the wireless communication terminal $300_1$ according to the present embodiment acquires remaining battery level information of a nearby terminal (the wireless communication terminal $300_2$ in FIG. 1) and then determines whether or not to use the proximity communication 420 for transmission of the interest packet on the basis of the acquired remaining battery level information. This allows the wireless communication terminal $300_1$ to acquire the content 430 while reducing the possibility that the wireless communication terminal $300_1$ and the wireless communication terminal $300_2$ run out of battery.

Note that the wireless communication terminals $300_1$ and $300_2$ have the same configuration. That is, the wireless communication terminal $300_2$ also determines whether or not to use the proximity communication 420 for transmission of an interest packet in consideration of a remaining battery level of the wireless communication terminal $300_1$ when the wireless communication terminal $300_2$ is about to acquire the content 430.

This allows the communication system 100 to reduce the possibility of running out of battery because of collaborative content acquisition in the whole proximity communication network.

Note that the wireless communication terminals $300_1$ and $300_2$ are collectively described as a "wireless communication terminal 300" as appropriate.

Namespace of Content Name

Next, a namespace of a content name used in the communication system 100 is described.

As described above, in the content-oriented network, it is unnecessary to designate a destination of request for content transmission, and it is only necessary that a terminal transmit an interest packet including a content name to the vicinity and wait for a reply of a data packet.

Figure 2:
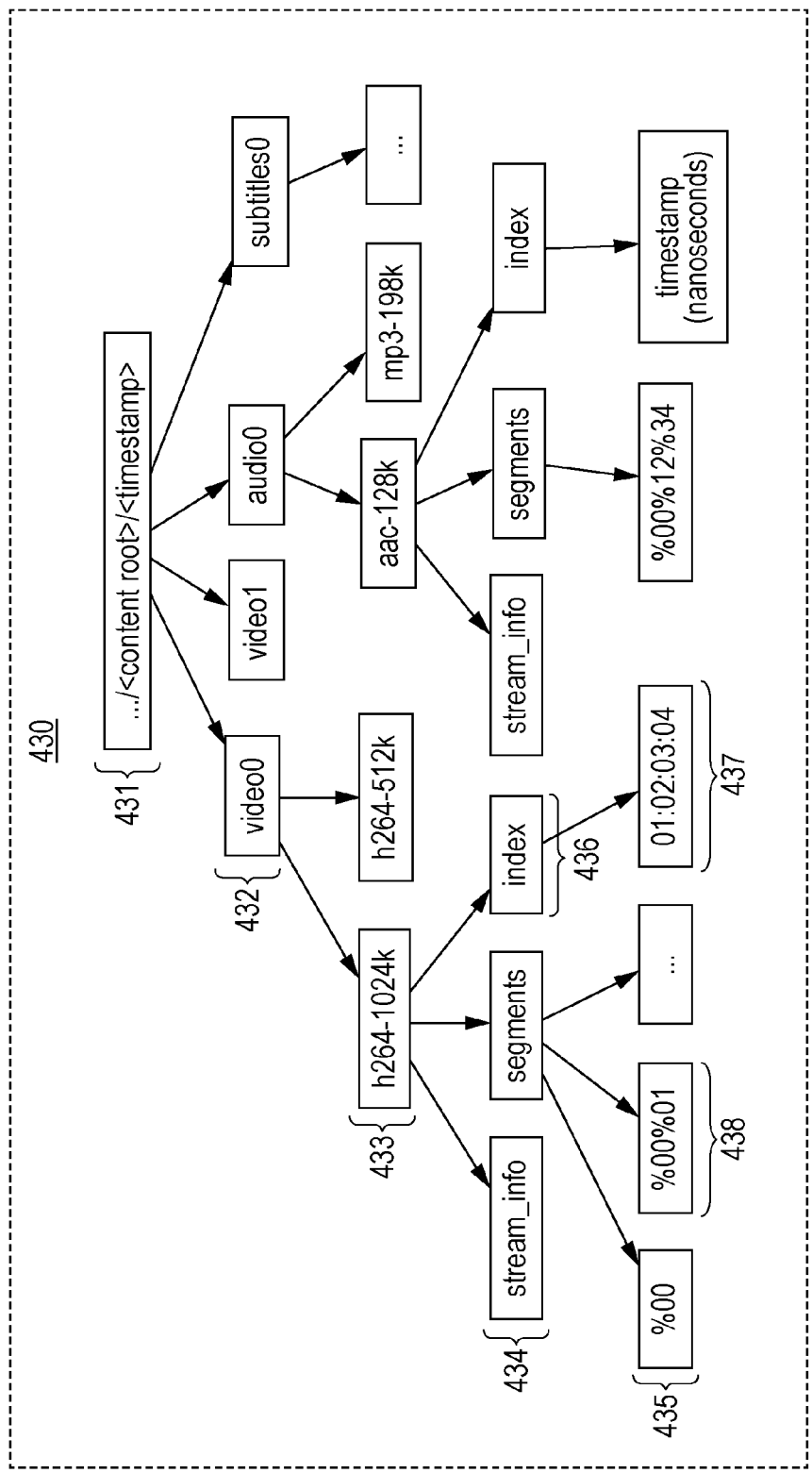
FIG. 2 is a diagram illustrating an example of a namespace used in the present embodiment.

FIG. 2 is a diagram illustrating an example of a namespace used in the communication system 100. Note that FIG. 2 illustrates a case where video content divided into a plurality of data sections (hereinafter referred to as "blocks") is managed.

As illustrated in FIG. 2, a namespace 430 used in the communication system 100 has a hierarchical structure. The namespace 430 includes a service name 431, a video number 432, a codec type 433, a data type 434, and a data body name 435 in the order from the top layer to the bottom layer.

It is assumed in the present embodiment that content acquiring processing is performed in two stages, i.e., access to an index and access to each block of the content. The index is information that defines, for each content, correspondence among a content name, the position of a block constituting the content, and a block name of the block constituting the content.

Access to the index is performed by using the index name, and access to the content is performed by using the content name.

The index name and the content name are constituted by a text string obtained by linking layers from the highest layer to an arbitrary layer of the namespace 430 with a diagonal sign.

The index name is, for example, defined by a text string that ends with a data type "index". An index name 436 of an index for access to certain content is, for example, "/content_root/video0/h264-1024k/index". An index 437 corresponding to the index name 436 is, for example, "/content_root/video0/h264-1024k/index/01:02:03:04". A content name 436 of a first block of the content that corresponds to the index 437 is, for example, "/content_root/video0/h264-1024k/segments/%00%01".

The data publishing terminal 220 defines such a namespace 430, and generates a data packet in association with the namespace 430 and publishes the data packet thus generated.

The wireless communication terminal 300 first issues (transmits) an interest packet designating an index name of content to be acquired such as data of desired video of a desired bit rate. Then, the wireless communication terminal 300 sequentially issues a plurality of interest packets designating names (content names) of respective blocks of the content on the basis of the index received in response to interest packet and thus sequentially acquires data packets of the respective blocks.

That is, the wireless communication terminal 300 first acquires an index which is information indicating "what time block was published and what name the block has" published in the namespace "index". Then, the wireless communication terminal 300 acquires block names such as " . . . segments/%00%01" from the index, issues interest packets designating the respective block names, and acquires the blocks (i.e., content).

As described above, in the content-oriented network, a procedure, such as a procedure of acquiring data after establishing connection, that is routinely performed in communication of TCP/IP (Transmission Control Protocol/Internet Protocol) can be simplified. Therefore, the content-oriented network has an advantage of being easier to acquire data of a nearby terminal.

Configuration of Data Packet

Next, a configuration of a data packet used as a reply of an index or content in the communication system 100.

Figure 3:
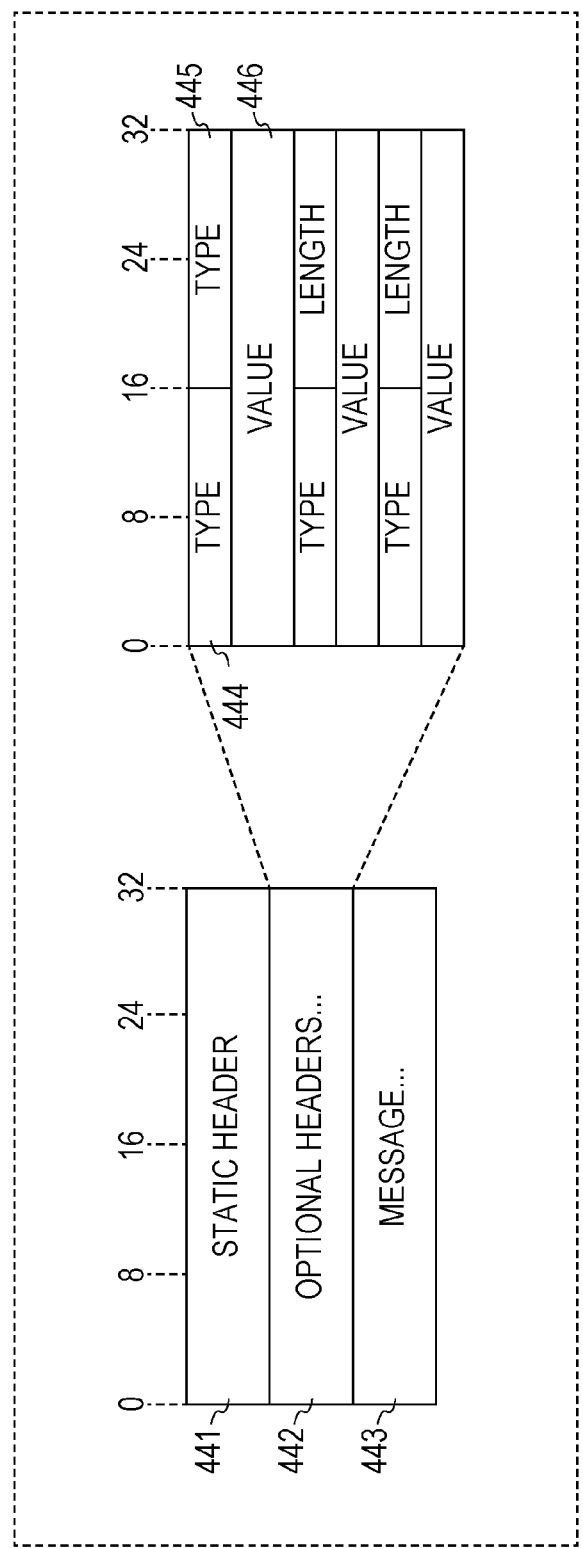
FIG. 3 is a diagram illustrating an example of a configuration of a data packet used in the present embodiment.

FIG. 3 is a diagram illustrating an example of a configuration of a data packet used in the communication system 100.

As illustrated in FIG. 3, a data packet 440 has a header section (Static Header) 441, an optional section (Optional Headers) 442, and a payload section (Message) 443.

The header section 441 stores therein information for identifying the type of data stored in the payload section 443. The optional section 442 stores therein additional information. The payload section 443 stores therein data to be transferred. Each section of the data packet 440 is described, for example, in a TLV (Type, Length, Value) format.

In the optional section 442, one or more pieces of information made up of a combination of a type 444, a length 445, and a value 446 is described.

For example, in a case where the data packet 440 stores an index in the payload section 443, remaining battery level information of a constant value such as "2000" [mAh] is described as the value 446. Furthermore, information indicating that the remaining battery level information is described is described as the type 444, and the length of data of the described remaining battery level information is described as the length 445.

Note that the remaining battery level information can be, for example, any of various values such as a value of a remaining battery level itself or a value expressing the ratio of the remaining battery level to the battery capacity in parts per hundred such as "100" [%] or in parts per ten thousand such as "2000/10000". For example, in a case where the remaining battery level is 1800 [mAh] in the wireless communication terminal 300 having a battery capacity of 3000 [mAh], the remaining battery level can be expressed as "1800/3000".

The remaining battery level information can be, for example, a remaining period in which the battery can be driven in a case where the proximity communication is continued. In this case, the battery driving period t can be, for example, calculated by dividing a remaining battery level w of a nearby terminal by electric power consumption P of the proximity communication.

Meanwhile, for example, in the case where the data packet 440 stores content in the payload section 443, namespace information (content name) such as "/content_root/video0/h264-1024k/segments/%00%01" is described as the value 446. Furthermore, information indicating that the namespace information is described is described as the type 444, and the length of data of the described namespace information is described as the length 445.

Each communication device that constitutes the content-oriented network searches names of data stored in the communication device for prefix longest match of the index name or the content name described in the received interest packet. The communication device describes the optional section 442 (see FIG. 3) of the data packet 440 on the basis of the name of the longest matching part.

For example, assume that a communication device that has a block with a content name "/content_root/video0/h264-1024/segments/%00" has received an interest packet designating "/content_root/video0/h264-1024/segments/%00". In this case, the communication device describes "/content_root/video0/h264-1024/segments/%00" as the value 446 of the optional section 442 of the data packet 440 and stores corresponding data in the payload section 443.

Meanwhile, assume that a communication device that has only a block with a content name "/content_root/video0/h264-1024/segments/%00" has receives an interest packet designating "/content_root/video0/h264-1024/segments/%01". In this case, the communication device transfers the received interest packet, for example, to the data publishing terminal 220 in accordance with transfer information. Furthermore, the communication device transmits, as a reply to the interest packet, the data packet 440 in which the longest matching part "/content_root/video0/h264-1024/segments/" is described in the value 446 of the optional section 442 to a transmission source of the interest packet. This makes it possible to notify the transmission source that the communication device has another data with a close content name distance.

Note that in a case where there is no data with the longest matching name, the communication device does not describe anything in the value 446 of the optional section 442 of the data packet 440 and describes "0" as the length 445. In this case, the communication device may describe, as the value 446, information indicating that the communication device does not have the content requested by the interest packet.

Configuration of Wireless Communication Terminal

Next, a configuration of the wireless communication terminal 300 is described.

Figure 4:
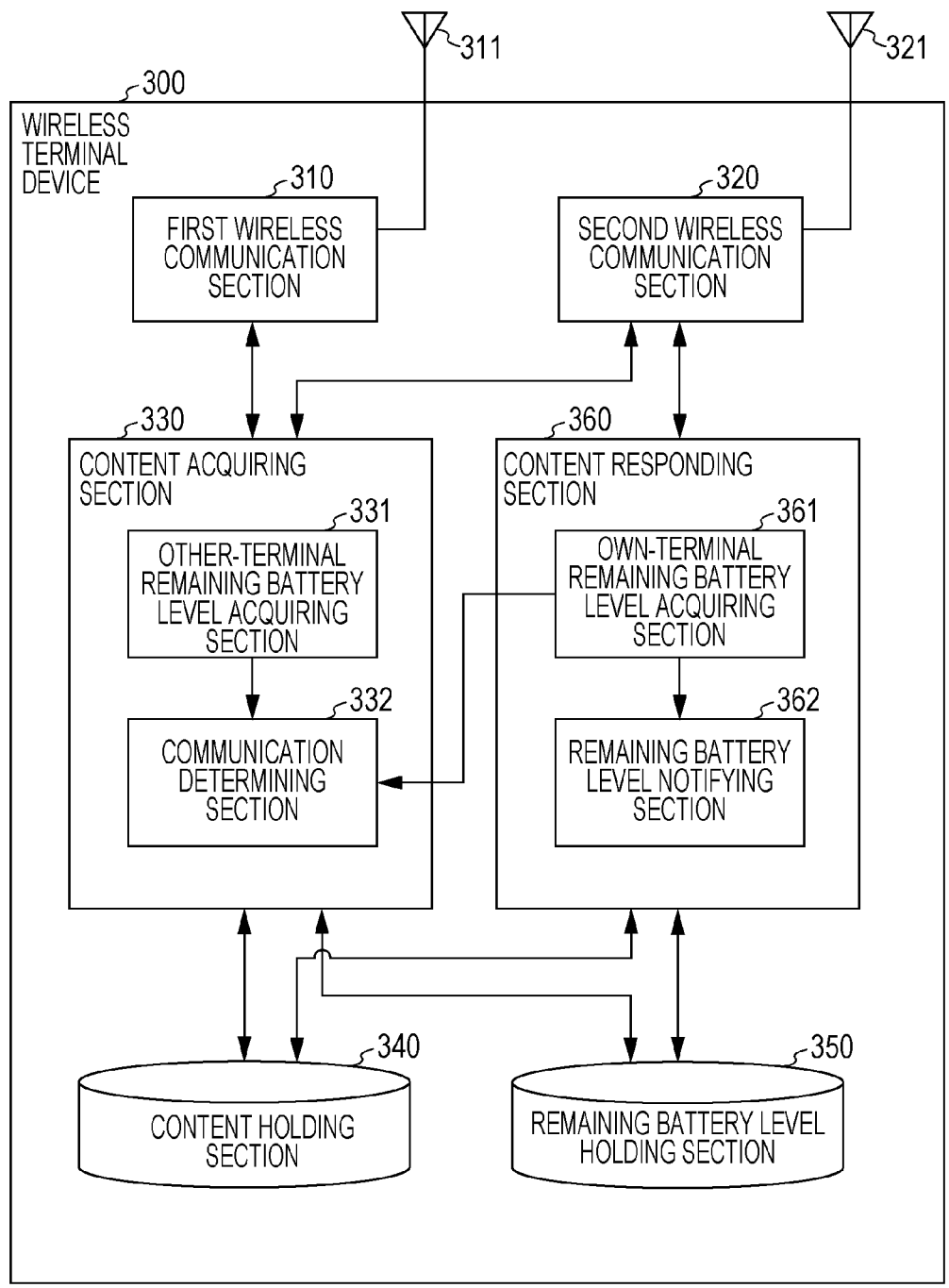
FIG. 4 is a block diagram illustrating an example of a configuration of a wireless communication terminal according to the present embodiment.

FIG. 4 is a block diagram illustrating an example of a configuration of a wireless communication terminal.

In FIG. 4, the wireless communication terminal 300 includes a first wireless communication section 310, a second wireless communication section 320, a content acquiring section 330, a content holding section 340, a remaining battery level holding section 350, and a content responding section 360.

The first wireless communication section 310 performs infrastructure communication with the wireless base station 200 via an antenna 311.

The second wireless communication section 320 performs proximity communication with a nearby terminal (another wireless communication terminal 300) via an antenna 321.

The content acquiring section 330 transmits an interest packet requesting content by using at least one of the infrastructure communication performed by the first wireless communication section 310 and the proximity communication performed by the second wireless communication section 320. The content acquiring section 330 includes an other-terminal remaining battery level acquiring section 331 and a communication determining section 332.

The other-terminal remaining battery level acquiring section 331 acquires remaining battery level information of a nearby terminal (hereinafter referred to as "other-terminal remaining battery level information").

More specifically, the other-terminal remaining battery level acquiring section 331 transmits an interest packet requesting an index of content to be acquired by using both of the infrastructure communication and the proximity communication. Then, the other-terminal remaining battery level acquiring section 331 extracts the other-terminal remaining battery level information from a data packet including the index and the other-terminal remaining battery level information (hereinafter referred to as "packet of an index") that is received as a reply to the interest packet.

Then, the other-terminal remaining battery level acquiring section 331 supplied the acquired index and the other-terminal remaining battery level information to the communication determining section 332. Furthermore, the other-terminal remaining battery level acquiring section 331 stores the other-terminal remaining battery level information in the remaining battery level holding section 350.

The communication determining section 332 determines whether or not to use proximity communication for transmission of an interest packet requesting content on the basis of the acquired other-terminal remaining battery level information. That is, the communication determining section 332 determines a used communication interface on the basis of the other-terminal remaining battery level information.

More specifically, the communication determining section 332 determines a predetermined threshold value in accordance with remaining battery level information of the wireless communication terminal 300 itself (hereinafter referred to as "own-terminal remaining battery level information") acquired by an own-terminal remaining battery level acquiring section 361 that will be described later. The communication determining section 332 determines that infrastructure communication is used for transmission of the interest packet instead of proximity communication under a condition that the value of the remaining battery level of the nearby terminal that is indicated by the other-terminal remaining battery level information is equal to or lower than the determined predetermined threshold value. That is, the communication determining section 332 determines that the interest packet is not transmitted to the nearby terminal.

Then, the communication determining section 332 generates an interest packet requesting content on the basis of the acquired index and then transmits the interest packet by using the determined communication.

Note that when the content acquiring section 330 acquires an index or content (hereinafter collectively referred to as "data" as appropriate), the content acquiring section 330 causes the acquired data to be stored in the content holding section 340.

The content holding section 340 holds the data stored by the content acquiring section 330.

Note that the wireless communication terminal 300 has a packet transfer section (not illustrated) that transfers, according to the transfer information, (i.e. index or manifest information), an interest packet or a data packet in accordance with the transfer information. When the packet transfer section transfers a data packet, the packet transfer section causes a copy of the data packet to be stored in the content holding section 340. That is, the content holding section 340 caches the transferred data.

The remaining battery level holding section 350 holds the other-terminal remaining battery level information stored by the content acquiring section 330.

The content responding section 360 performs, upon receipt of an interest packet requesting data from another communication device such as a nearby terminal, at least one of (i) transfer of the interest packet to another communication device and (ii) transmission of requested data as a reply to the interest packet. Note that in a case where the content responding section 360 transmits a packet of an index, the content responding section 360 causes the own-terminal remaining battery level information to be included in the packet. The content responding section 360 includes an own-terminal remaining battery level acquiring section 361 and a remaining battery level notifying section 362.

The own-terminal remaining battery level acquiring section 361 acquires own-terminal remaining battery level information. For example, the own-terminal remaining battery level acquiring section 361 measures a remaining battery level of a battery (not illustrated) provided in the wireless communication terminal 300 by using a known remaining battery level measurement method such as voltage measurement. Then, the own-terminal remaining battery level acquiring section 361 supplies the acquired own-terminal remaining battery level information to the communication determining section 332 and the remaining battery level notifying section 362.

Note that a timing at which the own-terminal remaining battery level acquiring section 361 acquires and supplies the own-terminal remaining battery level information may be a periodical timing or may be a timing at which there arises a need in a functional section such as a timing at which communication is determined by the communication determining section 332 or a timing at which a packet of an index is transmitted by the remaining battery level notifying section 362.

Furthermore, the own-terminal remaining battery level acquiring section 361 may cause the acquired own-terminal remaining battery level information to be stored in the remaining battery level holding section 350 instead of supplying the acquired own-terminal remaining battery level information to the communication determining section 332. In this case, the communication determining section 332 acquires the own-terminal remaining battery level information from the remaining battery level holding section 350.

The remaining battery level notifying section 362 notifies another communication device such as a nearby terminal of the acquired own-terminal remaining battery level information. More specifically, in a case where the data requested by the received interest packet is stored in the content holding section 340, the remaining battery level notifying section 362 generates a data packet including a copy of the requested data and then transmits the data packet to the transmission source of the interest packet as a reply to the interest packet. In a case where the remaining battery level notifying section 362 transmits a packet of an index as a reply to the interest packet, the remaining battery level notifying section 362 causes the acquired own-terminal remaining battery level information to be included in the packet.

Meanwhile, in a case where the requested data is not stored in the content holding section 340 and where corresponding transfer information is set, the content responding section 360 transfers the interest packet to another communication device in accordance with the transfer information. That is, the content responding section 360 has the function of the packet transfer section.

The wireless communication terminal 300 includes, for example, a CPU (Central Processing Unit), a storage medium such as a ROM (Read Only Memory) in which control programs are stored, and a working memory such as a RAM (Random Access Memory), each of which is not illustrated. In this case, the functions of the above sections are realized by CPU's execution of the control programs.

Furthermore, the wireless communication terminal 300 includes a wireless communication circuit and a user operation interface such as a display with a touch panel, each of which is not illustrated.

With such a configuration, when the wireless communication terminal 300 is about to acquire content, the wireless communication terminal 300 can acquire other-terminal remaining battery level information from a nearby terminal and determine whether or not to use proximity communication on the basis of the acquired other-terminal remaining battery level information. Furthermore, upon request of content from a nearby terminal, the wireless communication terminal 300 can notify the nearby terminal of own-terminal remaining battery level information, thereby allowing the nearby terminal to determine whether or not to use proximity communication.

Operation of Wireless Communication Terminal

Next, operation of the wireless communication terminal 300 is described.

Figure 5:
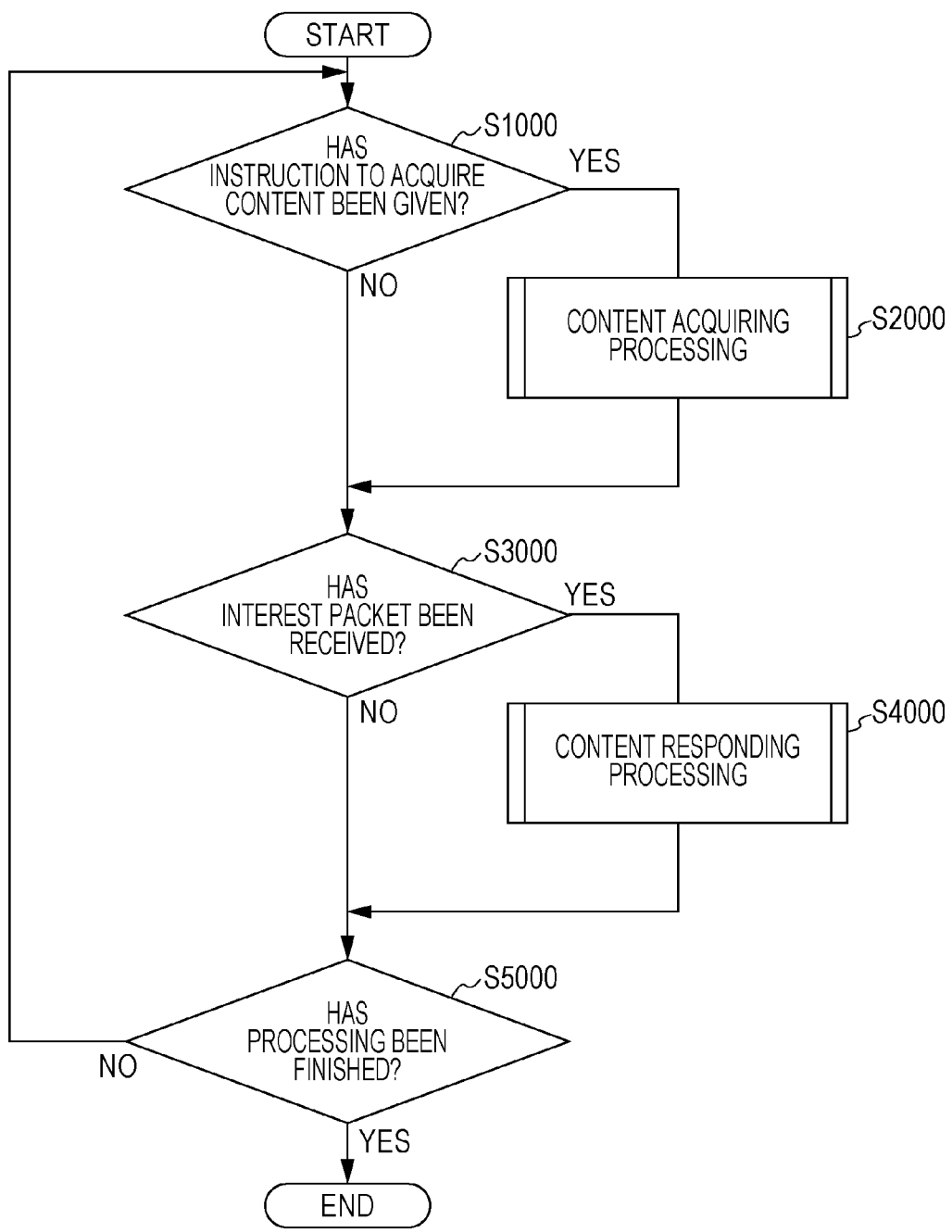
FIG. 5 is a flow chart illustrating an example of an operation of the wireless communication terminal according to the present embodiment.

FIG. 5 is a flow chart illustrating an example of operation of a wireless communication terminal.

In Step S1000, the content acquiring section 330 determines whether or not an instruction to acquire content has been given by a user's operation, application processing, or the like.

In a case where the content acquiring section 330 has been given the instruction to acquire content (YES in S1000), the processing proceeds to Step S2000. Meanwhile, in a case where the content acquiring section 330 has not been given the instruction to acquire content (NO in S1000), the processing proceeds to Step S3000 that will be described later.

In Step S2000, the content acquiring section 330 performs content acquiring processing, and then the processing proceeds to Step S3000. The content acquiring processing is processing for acquiring content having a designated content name.

In Step S3000, the content responding section 360 determines whether or not an interest packet has been received.

In a case where the content responding section 360 has received an interest packet (YES in S3000), the processing proceeds to Step S4000. Meanwhile, in a case where the content responding section 360 has not received an interest packet (NO in S3000), the processing proceeds to Step S5000 that will be described later.

In Step S4000, the content responding section 360 performs content responding processing, and then the processing proceeds to Step S5000. The content responding processing is processing for responding to the interest packet.

In Step S5000, the content acquiring section 330 determines whether or not an instruction to terminate predetermined processing including the content acquiring processing and the content responding processing has been given by a user's operation or the like.

In a case where the content acquiring section 330 has not been given the instruction to terminate the processing (NO in S5000), the processing returns to Step S1000. Meanwhile, in a case where the content acquiring section 330 has been given the instruction to terminate the processing (YES in S5000), the series of processing is finished.

Figure 6:
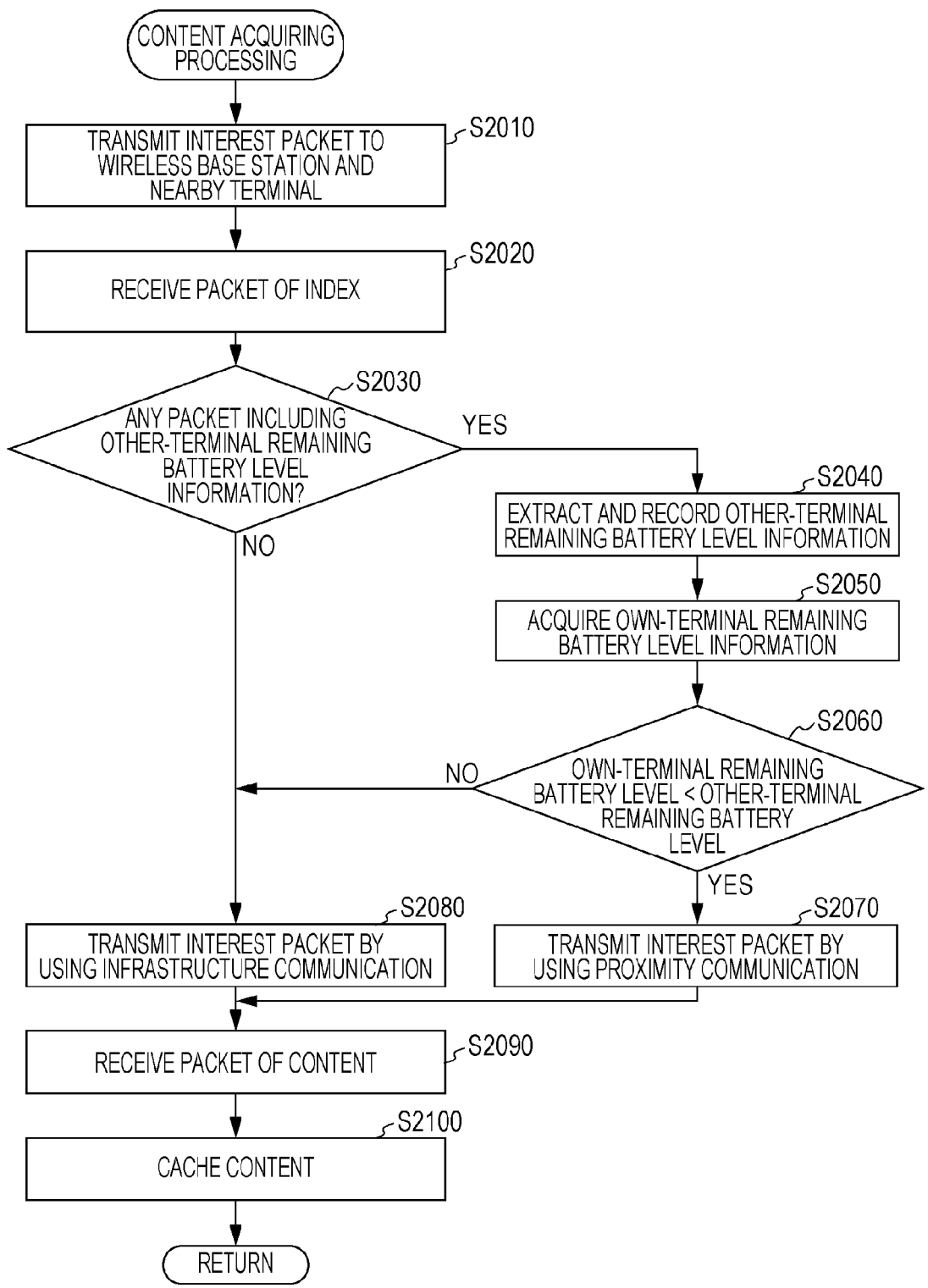
FIG. 6 is a flow chart illustrating an example of content acquiring processing in the present embodiment.

FIG. 6 is a flow chart illustrating an example of the content acquiring processing (Step S2000 in FIG. 5).

In Step S2010, the other-terminal remaining battery level acquiring section 331 transmits an interest packet requesting an index of designated content to the wireless base station 200 and a nearby terminal by using both infrastructure communication and proximity communication.

In Step S2020, the other-terminal remaining battery level acquiring section 331 receives a packet of the index from the wireless base station 200 or the nearby terminal as a reply to the interest packet. This packet is one that is transmitted from a communication device having corresponding content such as the data publishing terminal 220.

In Step S2030, the other-terminal remaining battery level acquiring section 331 determines whether or not a packet including other-terminal remaining battery level information has been received, i.e., whether or not there is a nearby terminal that has the content.

In a case where the other-terminal remaining battery level acquiring section 331 has received the packet including the other-terminal remaining battery level information (YES in S2030), the processing proceeds to Step S2040. Meanwhile, in a case where the other-terminal remaining battery level acquiring section 331 has not received the packet including the other-terminal remaining battery level information (NO in S2030), the processing proceeds to Step S2080 that will be described later.

In Step S2040, the other-terminal remaining battery level acquiring section 331 extracts the other-terminal remaining battery level information from the packet and then causes the other-terminal remaining battery level information to be stored (recorded) in the remaining battery level holding section 350. Note that in a case where the other-terminal remaining battery level acquiring section 331 receives a packet including other-terminal remaining battery level information from a plurality of nearby terminals, a plurality of pieces of other-terminal remaining battery level information are recorded.

In Step S2050, the communication determining section 332 acquires own-terminal remaining battery level information by using the own-terminal remaining battery level acquiring section 361 or from the remaining battery level holding section 350.

In Step S2060, the communication determining section 332 determines whether or not, among remaining battery levels (other-terminal remaining battery levels) indicated by the acquired other-terminal remaining battery level information, there is a remaining battery level (other-terminal remaining battery level) that is higher than a remaining battery level (own-terminal remaining battery level) indicated by the own-terminal remaining battery level information.

In a case where the communication determining section 332 determines that there is an other-terminal remaining battery level that is higher than the own-terminal remaining battery level (YES in S2060), the processing proceeds to Step S2070. In a case where the communication determining section 332 determines that there is no other-terminal remaining battery level that is higher than the own-terminal remaining battery level (NO in S2060), the processing proceeds to Step S2080 that will be described later.

Note that the contents of the determining processing in Step S2060 varies depending on the contents of the remaining battery level information. For example, in a case where the battery driving period t is used as the remaining battery level information, the communication determining section 332 determines whether the processing proceeds to Step S2070 or S2080 on the basis of whether or not there is a nearby terminal whose battery driving period $t=w/p$ exceeds a predetermined threshold value C. The threshold value C may be a constant value or may be a value that is determined in proportion to the own-terminal remaining battery level of the wireless communication terminal 300.

In Step S2070, the communication determining section 332 transmits an interest packet requesting content by using proximity communication. That is, the communication determining section 332 requests content from a nearby terminal that has transmitted the other-terminal remaining battery level information indicative of the other-terminal remaining battery level that is higher than the own-terminal remaining battery level.

In a case where there are a plurality of nearby terminals that satisfy the condition in Step S2060, the communication determining section 332 may transmit the interest packet to each of the plurality of nearby terminals. Alternatively, the communication determining section 332 may transmit the interest packet while sequentially selecting a nearby terminal one by one by a round-robin method. Alternatively, the communication determining section 332 may increase the frequency of transmission of the interest packet for a nearby terminal having a higher remaining battery level or a longer battery driving period.

Meanwhile, in Step S2080, the communication determining section 332 transmits an interest packet requesting content by using infrastructure communication. That is, the communication determining section 332 requests content not from a nearby terminal that has transmitted other-terminal remaining battery level information indicative of an other-terminal remaining battery level that is equal to or lower than the own-terminal remaining battery level, but from a communication device on the wireless base station 200 side (for example, the data publishing terminal 220).

Note that the communication determining section 332 may determine that both infrastructure communication and proximity communication are used in a case where the own-terminal remaining battery level has become close to a lower other-terminal remaining battery level. In this case, the communication determining section 332 may notify a nearby terminal that data acquisition has been started in the wireless communication terminal 300. Furthermore, in a case where notification of the start of data acquisition in the nearby terminal is received from the nearby terminal, the communication determining section 332 may determine that proximity communication is used.

In Step S2090, the communication determining section 332 receives a packet of the content by using the determined communication as a reply to the interest packet.

In Step S2100, the content acquiring section 330 performs predetermined processing such as video reproducing processing on the received content and caches the received content together with the index. Then, the processing proceeds to Step S3000 in FIG. 5.

Note that the content acquiring section 330 may perform operation in a neighbor discovery phase prior to content acquisition. The neighbor discovery phase is a phase that is set at a timing such as a timing immediately after power activation of the wireless communication terminal 300, a timing immediately before recovery from a standby state, or a timing immediately after movement and is a phase in which a communication partner (nearby terminal) with which the wireless communication terminal 300 can communicate by using proximity communication is searched for.

In the neighbor discovery phase, the content acquiring section 330 broadcasts or multicasts an interest packet by using both infrastructure communication and proximity communication. Then, in a case where no nearby terminal is discovered, the content acquiring section 330 performs content acquisition by using only infrastructure communication.

Note that the aforementioned operation of transmitting an interest packet requesting an index may be considered as the operation in the neighbor discovery phase.

Furthermore, when transmitting an interest packet requesting an index, the content acquiring section 330 may select used communication by performing determining processing similar to that in Step S2060 on the basis of previously-acquired other-terminal remaining battery level information. Then, in a case where there is no reply to the transmitted interest packet, the content acquiring section 330 may broadcast or multicast an interest packet requesting an index by using infrastructure communication and proximity communication.

Figure 7:
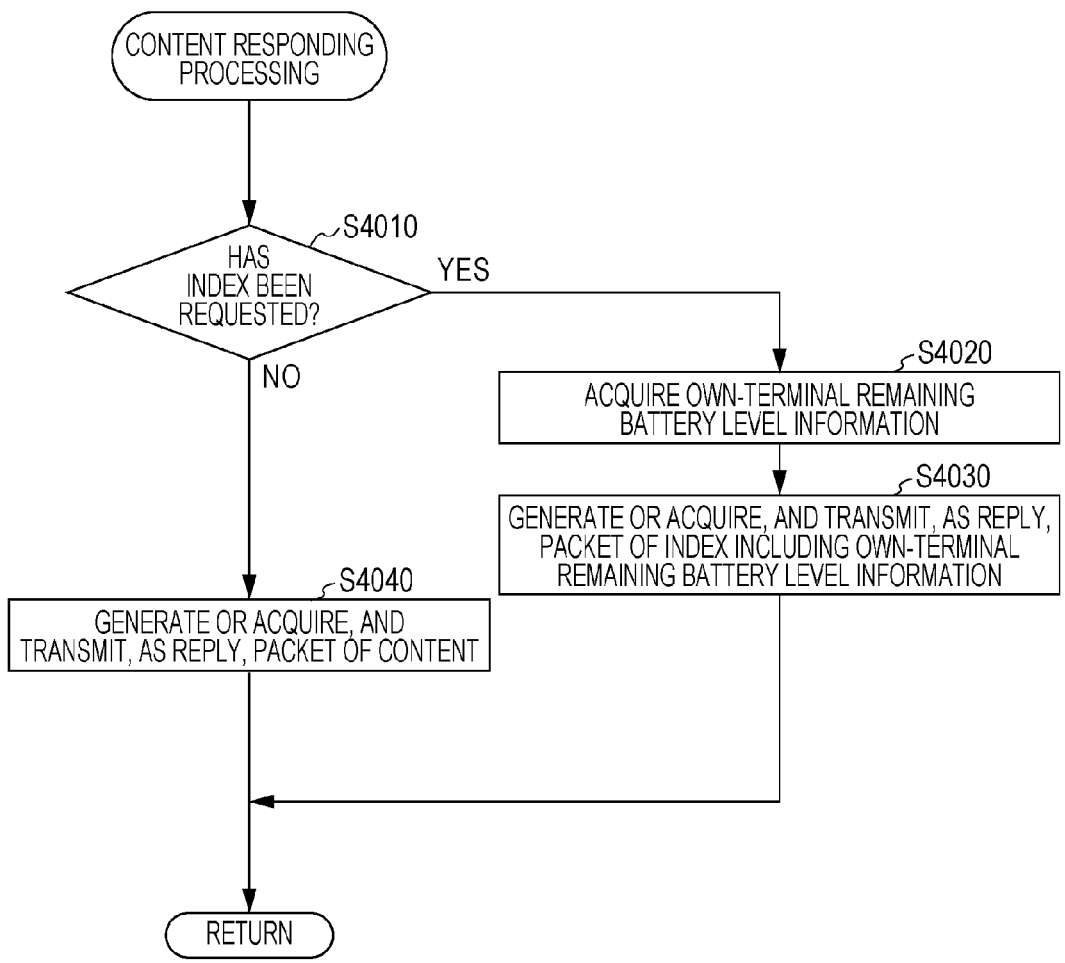
FIG. 7 is a flow chart illustrating an example of content responding processing in the present embodiment.

FIG. 7 is a flow chart illustrating an example of the content responding processing (Step S4000 in FIG. 5).

In Step S4010, the content responding section 360 determines whether or not a received interest packet is one requesting an index.

In a case where the content responding section 360 determines that the received interest packet is one requesting an index (YES in S4010), the processing proceeds to Step S4020. Meanwhile, in a case where the content responding section 360 determines that the received interest packet is one requesting content (NO in S4010), the processing proceeds to Step S4040 that will be described later.

In Step S4020, the own-terminal remaining battery level acquiring section 361 acquires own-terminal remaining battery level information.

In Step S4030, the remaining battery level notifying section 362 generates a packet of the index including the own-terminal remaining battery level information and then transmits the packet to a transmission source of the interest packet as a reply to the interest packet, and then the processing proceeds to Step S5000 in FIG. 5.

Note that in a case where the requested index is stored in the content holding section 340, the remaining battery level notifying section 362 reads out the index and stores the index in the packet, but in a case where the requested index is not stored in the content holding section 340, the remaining battery level notifying section 362 transfers the interest packet to another communication device. In a case where a packet of the index is received (acquired) from the other communication device as a result of transfer of the interest packet, the remaining battery level notifying section 362 causes the own-terminal remaining battery level information to be included in the received packet and transmit, as a reply, the received packet to the transmission source of the interest packet.

In Step S4040, the content responding section 360 generates a packet of the content and transmits the packet to the transmission source of the interest packet as a reply to the interest packet, and then the processing proceeds to Step S5000 in FIG. 5.

Note that in a case where the requested content is stored in the content holding section 340, the remaining battery level notifying section 362 reads out the content and stores the content in the packet, but in a case where the requested content is not stored in the content holding section 340, the remaining battery level notifying section 362 transfers the interest packet to another communication device. In a case where a packet of the content is received (acquired) from the other communication device as a result of transfer of the interest packet, the remaining battery level notifying section 362 causes the own-terminal remaining battery level information to be included in the received packet and then transmits the received packet to the transmission source of the interest packet as a reply to the interest packet.

In a case where requested data is not held, the content responding section 360 may cause the content acquiring section 330 to generate an interest packet and then transmit the interest packet to another communication device. Then, the content responding section 360 may transmit, as a reply, data acquired from the other communication device to a request source.

In a case where the content acquiring section 330 has already transmitted an interest packet requesting the requested data to another communication device, the content responding section 360 may transmit a reply to a request source after receiving a response to the interest packet.

Note that in a case where the requested data cannot be acquired, for example, because corresponding transfer information is not set, the remaining battery level notifying section 362 does not transmit a reply to a transmission source of the interest packet.

Through such operation, the wireless communication terminal 300 can acquire content while actively using proximity communication, which consumes less electric power, and in a case where a remaining battery level of a nearby terminal is lower than that of the wireless communication terminal 300, avoiding use of proximity communication with the nearby terminal. Furthermore, the wireless communication terminal 300 can notify a nearby terminal of the remaining battery level of the wireless communication terminal 300 before an interest packet requesting content is transmitted from the nearby terminal.

Other Examples of Communication Determining Method

Note that the wireless communication terminal 300 may determine communication used for content acquisition on the basis of not only remaining battery level information of a nearby terminal but also electric power needed when content is acquired from each communication device.

In this case, the wireless communication terminal 300 uses, for example, an electric power information table in which electric power (hereinafter referred to as "electric power consumption") needed to acquire content per unit amount and an acquired remaining battery level are recorded for each of other communication devices.

FIG. 8 is a diagram illustrating an example of the electric power information table.

As illustrated in FIG. 8, for example, identification information (ID) 511 of a wireless communication section, a destination type (communication type) 512, identification information (ID) 513 of a communication device, electric power consumption 514, and a remaining battery level 515 are described in association with one another in an electric power information table 510.

The identification information 511 of a wireless communication section indicates via which of the first wireless communication section 310 and the second wireless communication section 320 communication with a communication device corresponding to the identification information 513 is performed. The destination type 512 indicates which of infrastructure communication and proximity communication (terminal-terminal communication) is used to acquire content from the communication device corresponding to the identification information 513. The electric power consumption 514 indicates electric power consumed in the communication device corresponding to the identification information 513 in a case where content of a unit amount is acquired from the communication device. The remaining battery level 515 is, for example, a value expressing a remaining battery level of the communication device corresponding to the identification information 513 in parts by hundred.

For example, in the neighbor discovery phase, the wireless communication terminal 300 creates the electric power information table 510 in which information other than the remaining battery level 515 is described and then causes the electric power information table 510 to be stored in the remaining battery level holding section 350. Then, the other-terminal remaining battery level acquiring section 331 inputs a remaining battery level indicated by acquired other-terminal remaining battery level information to the electric power information table 510 or overwrites the electric power information table 510 with the remaining battery level indicated by the acquired other-terminal remaining battery level information every time the other-terminal remaining battery level information is acquired from a nearby terminal.

Note that the other-terminal remaining battery level acquiring section 331 may receive, from another communication device, electric power consumption actually measured in the communication device and then input the electric power consumption to the electric power consumption 514 of the electric power information table 510.

Furthermore, the other-terminal remaining battery level acquiring section 331 may correct the value of the electric power consumption 514 of the electric power information table 510 in accordance with states of infrastructure communication and proximity communication. Specifically, for example, in a case where a packet loss rate is high in communication with a communication device or in a case where a signal-to-noise ratio is poor and only an inefficient modulation method can be used in communication with a communication device, the other-terminal remaining battery level acquiring section 331 increases the value of the electric power consumption 514 of this communication device. Conversely, for example, in a case where a communication state with a communication device has improved, the other-terminal remaining battery level acquiring section 331 decreases the value of the electric power consumption 514 of this communication device.

Note that the other-terminal remaining battery level information is not limited to the aforementioned one. For example, the other-terminal remaining battery level information may be a value indicative of a period for which a nearby terminal can operate on its battery, a value indicative of the speed of battery consumption and the battery capacity, or a value combining these. That is, the other-terminal remaining battery level information can be any value representative of a period, a processing amount, or the like that is left for user's continuous use of a nearby terminal, that is, information that should be noted in consideration of useful usage of the nearby terminal by the user.

Furthermore, the other-terminal remaining battery level acquiring section 331 may acquire viability information of each nearby terminal and then input the acquired viability information to the electric power information table 510. For example, the other-terminal remaining battery level acquiring section 331 manages, for each nearby terminal, the time of the last response of the nearby terminal, the intensity of the electric power, an error rate at packet transmission, and the like and determines that a nearby terminal that does not satisfy a certain condition is assumed not to exist.

Specifically, the other-terminal remaining battery level acquiring section 331 determines that a nearby terminal from which no response is received for a predetermined period or longer or a nearby terminal whose error rate is extremely high is assumed not to exist. Furthermore, the other-terminal remaining battery level acquiring section 331 determines that, for example, in a case where throughput obtained in communication with a nearby terminal does not satisfy a bandwidth needed for content acquisition, the nearby terminal is assumed not to exist.

Other Use Example of Optional Section of Packet

Each communication device may describe hint information concerning data possessed by the communication device in the optional section 442 (see FIG. 3) of the data packet 440.

For example, information indicative of existence of future data, existence of past data, existence of data of a different bit rate, existence of data of different resolution, existence of data of a different codec, or existence of data of a different angle is described in the type 444. That is, these data are data that has high relevance with requested data.

Existence of future data indicates that data whose reproduction time is later than that of data designated by an interest packet is held. That is, the future data is, for example, data that is given a larger serial number or data that is given a time stamp of a future time. In this case, for example, information indicative of an offset in a future direction such as a difference between the serial number of the interest packet and the serial number of the future data is described as the value 446. The wireless communication terminal 300 that has received such a data packet may, for example, notify a user that the future data can be acquired speedily.

Existence of past data indicates that data whose reproduction time is earlier than that of data designated by an interest packet is held. That is, the past data is, for example, data that is given a smaller serial number or data that is given a time stamp of a past time. In this case, for example, information indicative of an offset in a past direction such as a difference between the serial number of the interest packet and the serial number of the past data is described as the value 446. The wireless communication terminal 300 that has received such a data packet may, for example, notify a user that the past data can be acquired speedily.

Existence of data of a different bit rate indicates that data that has the same contents as data indicated by an interest packet and that is coded at a different bit rate is held. In this case, for example, a codec type is described as the value 446. The wireless communication terminal 300 that has received such a data packet may, for example, notify a user that the data of a different bit rate can be acquired speedily. Furthermore, in a case where a packet loss that occurs due to an insufficient bandwidth is large, the wireless communication terminal 300 may change behavior of an application that has given an instruction to acquire content so that the application automatically requests data of a lower bit rate.

Existence of data of different resolution indicates that data that has the same contents as data designated by an interest packet and that has different resolution is held. In this case, for example, information indicative of resolution is described as the value 446. The wireless communication terminal 300 that has received such a data packet may, for example, notify a user that the data of different resolution can be acquired speedily. Furthermore, in a case where the wireless communication terminal 300 has a high remaining battery level, a sufficient bandwidth, and a capability to display a high-resolution image, the wireless communication terminal 300 may change the behavior of an application that has given an instruction to acquire content so that the application automatically requests data of higher resolution.

Existence of data of a different angle indicates that data obtained by capturing the same target as that of data designated by an interest packet from a different direction or distance is held. In this case, for example, information indicative of a direction or a distance of capturing is described as the value 446. The wireless communication terminal 300 that has received such a data packet may, for example, notify a user that the data of a different angle can be acquired speedily.

Note that the nearby terminal may transmit a content name of content possessed by the nearby terminal. In this case, the wireless communication terminal 300 may increase the frequency of notification of hint information to a user as a name distance of the content whose possession by the nearby terminal has been notified is closer. The name distance is a distance in a namespace from content that is being viewed or searched for by the user. The name distance can be, for example, the length of a longest-matching part, a Levenshtein distance, or a Jaro-Winkler distance.

In a case where these pieces of hint information are included in the data packet 440, each communication device may or may not cause corresponding data such as future data to be included in the payload section 443 of the data packet 440.

Effects of Present Embodiment

As described above, the wireless communication terminal 300 according to the present embodiment that is about to acquire content acquires other-terminal remaining battery level information from a nearby terminal and then determines whether or not to use proximity communication on the basis of the acquired other-terminal remaining battery level information. Furthermore, upon request of content from a nearby terminal, the wireless communication terminal 300 according to the present embodiment notifies the nearby terminal of the own-terminal remaining battery level information and causes the nearby terminal to determine whether or not to use proximity communication.

With the arrangement, each wireless communication terminal 300 can determine whether to use infrastructure communication or proximity communication for content acquisition on the basis of not only a remaining battery level of the wireless communication terminal 300 itself but also a remaining battery level of a nearby terminal. Therefore, the wireless communication terminal 300 according to the present embodiment can reduce the possibility of running out of battery in the whole nearby terminal network because of collaborative content acquisition.

If there is a high possibility of running out of battery due to other persons, a user of each wireless communication terminal 300 becomes reluctant to perform collaborative content acquisition.

In this respect, the wireless communication terminal 300 according to the present embodiment determines communication to be used so as to also reduce the possibility that a nearby terminal runs out of battery by referring to own-terminal remaining battery level information and other-terminal remaining battery level information as described above. That is, the wireless communication terminal 300 according to the present embodiment can realize a system in which terminals take turn to play the role of acquiring data by using infrastructure communication so that consumption of batteries does not unevenly progress in the whole proximity communication network.

Therefore, the wireless communication terminal 300 according to the present embodiment makes it possible to acquire content such as a high-quality image, audio, and video while sharing a wireless band, for example, among a plurality of users who have a common interest and while saving electric power.

In the communication system 100 using the wireless communication terminal 300 according to the present embodiment, accesses to the same namespace are automatically reconciled, and it becomes clear that the wireless communication terminal 300 is collaborating with a nearby terminal on an operation of acquiring the same content. Furthermore, such reconciliation and collaboration are guaranteed at the design stage.

Therefore, a user of each wireless communication terminal 300 becomes more active to perform collaborative content acquisition and is more likely to agree (opt-in) on activating a used wireless communication terminal 300's function of transferring data to a nearby terminal. This promotes collaborative content acquisition, thereby realizing a good content acquisition environment.

Use of such a wireless communication terminal 300 makes it possible to suppress electric power consumption as a whole while effectively utilizing a wireless band in a case where a large number of users share the same data in an environment in which the density of terminals is high such as a sport stadium, an event site, a station, or an intersection. The case where a large number of users share the same data is, for example, a case where a large number of spectators play back a goal scene in the first half of a football game during a halftime of the game or a case where a large number of passengers view a moving image of yesterday's news while commuting on a train.

Note that the wireless communication terminal 300 may accept a user's operation of disabling the function of transferring data to a nearby terminal. In this case, for example, the remaining battery level notifying section 362 stops transmission of own-terminal remaining battery level information to the nearby terminal.

Other Examples of Remaining Battery Level Information Notification Method

Note that a method for notifying a nearby terminal of remaining battery level information is not limited to the aforementioned example.

For example, the content responding section 360 that is about to transmit a data packet as a reply may acquire own-terminal remaining battery level information and insert the own-terminal remaining battery level information in the optional section of the data packet intermittently with a specific probability. Alternatively, the content responding section 360 may transmit the data packet including the own-terminal remaining battery level information by unicast communication or may transmit the data packet including the own-terminal remaining battery level information by multicast communication or broadcast communication intermittently or with a specific probability. The content acquiring section 330 may acquire other-terminal remaining battery level information by receiving a data packet that is transmitted from a nearby terminal by multicast or broadcast communication even if the content acquiring section 330 itself has not transmitted an interest packet.

In particular, in a case where the two-stage processing, i.e., index acquisition and data main body acquisition is not performed, remaining battery level information needs to be transmitted to a nearby terminal by using a packet of content or a packet including other control information.

The content responding section 360 may insert acquired own-terminal remaining battery level information in an interest packet intermittently with a specific probability.

The content responding section 360 may transmit a packet for notification of the own-terminal remaining battery level information in the neighbor discovery phase separately from the interest packet.

Other Use Examples of Optional Section

The wireless communication terminal 300 may cause various kinds of additional information concerning the wireless communication terminal 300 to be included in the optional section of the data packet. The additional information is, for example, positional information, a current moving speed, the name of a carrier that provides a service of connection with infrastructure communication, an entire capacity of the battery, and a remaining battery level.

The wireless communication terminal 300 that has received the additional information from a nearby terminal can performs an operation according to the contents of the received additional information. For example, the wireless communication terminal 300 adjusts the amount of electric power (the intensity of a wireless signal) in transmission of an interest packet on the basis of the positional information and stops transmission of a next interest packet in a case where absence of a nearby terminal in a delivery range is anticipated on the basis of the moving speed of the nearby terminal. Furthermore, the wireless communication terminal 300 preferentially select, as a destination of the interest packet, a nearby terminal subscribing the same carrier and a nearby terminal that has a large battery capacity and a large remaining battery level.

Other Modifications

The embodiment of the present disclosure described above can be modified and applied to a method of content acquisition performed without acquisition of an index in a content-oriented network. In this case, remaining battery level information is transmitted, for example, by using a packet that is transmitted and received in a neighbor discovery phase.

The contents and type of content that is a target of collaborative acquisition are not limited to the above-mentioned example. For example, the content may be streaming data of video and audio or HTML (HyperText Markup Language) or XML (eXtentible Markup Language) text information.

The wireless communication terminal 300 is also suitable for a battery-driven sensor terminal disposed in a farm, a pasture, a remote area, or the like. In this case, the sensor terminal determines whether to use satellite communication, which corresponds to infrastructure communication, or communication between sensor terminals, which corresponds to proximity communication on the basis of other-terminal remaining battery level information, for example, when acquiring data for updating software of the sensor terminal from a server.

The present disclosure is useful as a wireless communication terminal and a wireless communication method that can reduce the possibility of running out of battery because of collaborative content acquisition.

What is claimed is:

1. A wireless communication terminal comprising:
a processor; and
a non-transitory memory storing thereon a program which is executed by the processor, the program causing the processor to:
transmit, to a plurality of communication devices a first interest packet requesting for transmission of an index of content to the wireless communication terminal via a content-oriented network, in which content management or content routing is performed based on a content name corresponding to the index of the content;
receive a first data packet, from a first communication device among the plurality of communication devices, in response to the first interest packet, the first data packet including i) the index of the content and ii) first remaining battery level information indicating a first remaining battery level of the first communication device; and determine to transmit to the first communication device a second interest packet requesting for transmission of the content to the wireless communication terminal when it is determined that the first remaining battery level is higher than a predetermined threshold value, wherein in a case where it is determined that the second interest packet is transmitted to the first communication device, the program further causes the processor to:

transmit the second interest packet to the first communication device;

receive, from the first communication device, a second data packet including a block that constitutes the content in response to the second interest packet, the second data packet including second remaining battery level information indicating a second remaining battery level of the first communication device; and determine whether or not to transmit to the first communication device a third interest packet requesting for transmission of a next block that constitutes the content to the wireless communication terminal, when it is determined that the second remaining battery level is higher than the predetermined threshold value.

2. The wireless communication terminal according to claim 1, wherein
the first communication device exists within a predetermined range from the wireless communication terminal.

3. The wireless communication terminal according to claim 1, wherein
in a case where the remaining battery level is equal to or lower than the predetermined threshold value, it is determined that the second interest packet is not transmitted to the first communication device.

4. The wireless communication terminal according to claim 1, wherein
the first interest packet includes namespace information commonly used for the wireless communication terminal and the plurality of the communication devices in the content-oriented network.

5. The wireless communication terminal according to claim 1, wherein
the program further causes the processor to:
acquire, within the wireless communication terminal, its own-terminal remaining battery level information indicating a remaining battery level of the wireless communication terminal; and
determine the predetermined threshold value based on the own-terminal remaining battery level information.

6. The wireless communication terminal according to claim 1, wherein
the program further causes the processor to transmit the second interest packet to a wireless base station via the content-oriented network, in a case where it is determined that the second interest packet is not transmitted to the first communication device.

7. The wireless communication terminal according to claim 1, wherein
the program further causes the processor to transmit the second interest packet to a second communication device that is different from the first communication device in a case where it is determined that the second interest packet is not transmitted to the first communication device.

8. A wireless communication method for a wireless communication terminal, comprising:
transmitting to a plurality of communication devices, a first interest packet requesting for transmission of an index of content to the wireless communication terminal, in a content-oriented network, in which content management or content routing is performed based on a content name corresponding to the index of the content;
receiving a first data packet, from a first communication device among the plurality of communication devices, in response to the first interest packet, the first data packet including the index and first remaining battery level information indicating a first remaining battery level of the first communication device;
determining to transmit, to the first communication device a second interest packet requesting for transmission of the content to the wireless communication terminal when it is determined that the first remaining battery level is higher than a predetermined threshold value;
transmitting the second interest packet to the first communication device;
receiving a second data packet including a block that constitutes the content from the first communication device in response to the second interest packet, wherein the second data packet includes second remaining battery level information indicating a second remaining battery level of the first communication device; and
determining whether or not to transmit to the first communication device a third interest packet requesting for transmission of a next block that constitutes the content to the wireless communication terminal, when it is determined that the second remaining battery level is more than the predetermined threshold value.

* * * * *